United States Patent
Grohs et al.

(10) Patent No.: US 9,798,578 B2
(45) Date of Patent: Oct. 24, 2017

(54) ENABLING NATIVE APPLICATION CAPABILITIES BASED ON OBJECT CAPABILITIES

(71) Applicant: Hewlett-Packard Development Company, L.P., Houston, TX (US)

(72) Inventors: Randall Edwards Grohs, Star, ID (US); Galo Gimenez Palop, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/307,276

(22) PCT Filed: Apr. 30, 2014

(86) PCT No.: PCT/US2014/036145
§ 371 (c)(1),
(2) Date: Oct. 27, 2016

(87) PCT Pub. No.: WO2015/167522
PCT Pub. Date: Nov. 5, 2015

(65) Prior Publication Data
US 2017/0046197 A1    Feb. 16, 2017

(51) Int. Cl.
*G06F 9/46*    (2006.01)
*G06F 9/44*    (2006.01)
*G06F 17/30*   (2006.01)

(52) U.S. Cl.
CPC ............ *G06F 9/468* (2013.01); *G06F 9/4428* (2013.01); *G06F 17/30424* (2013.01)

(58) Field of Classification Search
None
See application file for complete search history.

(56) References Cited

U.S. PATENT DOCUMENTS

| | | | |
|---|---|---|---|
| 2007/0094471 A1* | 4/2007 | Shaath | G06F 12/1466 711/163 |
| 2011/0051176 A1 | 3/2011 | Kang et al. | |
| 2012/0158513 A1* | 6/2012 | Schoen | G06Q 30/0269 705/14.66 |
| 2013/0067527 A1 | 3/2013 | Ashbrook et al. | |
| 2013/0073626 A1 | 3/2013 | Hong et al. | |
| 2013/0191339 A1 | 7/2013 | von Haden et al. | |
| 2014/0032707 A1* | 1/2014 | Doshi | G06F 9/542 709/217 |

(Continued)

*Primary Examiner* — Timothy A Mudrick
*Assistant Examiner* — Abdou Seye
(74) *Attorney, Agent, or Firm* — HP Inc. Patent Department (57) ABSTRACT

Example implementations relate to enabling native application capabilities. Some implementations may determine a set of object capabilities related to a source object stored in a remote third party repository. In some examples, the set of object capabilities represent at least one capability associated with the source object available to a third party application handling the source object. Some implementations may also determine a native application capability associated with the source object based on the determined set of object capabilities. Some implementations may also enable, in a native application, the native application capability for the source object.

18 Claims, 5 Drawing Sheets

(56) References Cited

U.S. PATENT DOCUMENTS

2014/0331126 A1* 11/2014 Hunter ................ G06F 17/2288
715/256
2015/0088942 A1* 3/2015 Shah ................ G06F 17/30238
707/827

* cited by examiner

ENABLING NATIVE APPLICATION CAPABILITIES BASED ON OBJECT CAPABILITIES

BACKGROUND

A typical user of a computing device may access a number of different remote repositories that store data and programs. For instance, a typical user may access third party services that deliver software, infrastructure, and storage over a network, such as the Internet. Even though a typical user may not know the physical location or the configuration of the computing systems that deliver these remote third party services, a user may still able to store, manage, and/or otherwise process data related to those services using an application, such as a web browser, running on the users computing device.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, users may access third party services to remotely store, manage, and/or otherwise process data. For example, users may access third party services to launch applications, create and modify documents, receive and send emails, play and store music files, upload and edit videos, store and share photos, and/or otherwise store, manage, and process data remotely. The data is typically stored in infrastructure owned, operated, or otherwise managed by the third party, and the third party may provide its own interface so that users can access their data via the third party's service. For example, a third party may store a user's data in a remote content repository, and may offer access to that data through a web page, a mobile phone application, and the like.

While each third party may offer its own interface to access its services, some content management applications may provide access to multiple third party services via a single interface. For example, some content management applications may allow a user to access data stored in multiple repositories operated by different third parties using a common application program interface ("API"). This common API may provide functionality such as collaboration and sharing, workflows, previews, searching and the like regardless of where the content is stored. However, not all third party services provide the same set of capabilities. For example, some services may allow comments on photos, while other services may not. Similarly, some services may allow full-text searching in documents, while others may only allow metadata searching. Accordingly, some content management applications may only offer capabilities common across all third party repositories, rather than the capabilities available to a user when a particular object (e.g., a file or a folder) is being handled by a third party application. Furthermore, those capabilities may not be known in advance because such knowledge would impose a tight coupling between an application and a third party repository. This tight coupling may reduce the scalability of the application as the number of third parties and/or the number of features offered by the third parties grow. Accordingly, to provide a good user experience, applications should be capable of enabling capabilities related to a particular source object rather than limiting capabilities to those common across all repositories.

Examples disclosed herein enable native application capabilities. To this end, example implementations disclosed herein may determine, from a source object stored in a repository, a set of object capabilities related to the source object. For example, some implementations may query a federated repository for the set of object capabilities and receive the set of object capabilities in response to the query. Some example implementations may also determine at least one native application capability associated with the source object based on the determined set of object capabilities. For example, some implementations may compare a set of core capabilities to the set of object capabilities and select, as the native application capability in the set of object capabilities that corresponds with a capability in the set of object capabilities. Some example implementations may also enable, in the native application, the at least one native application capability for the third party application. For example, some implementations may provide functionality to perform an action associated with the source object via the native application capability and may translate a request related to the action into a native request to the third party application.

Figure 1:
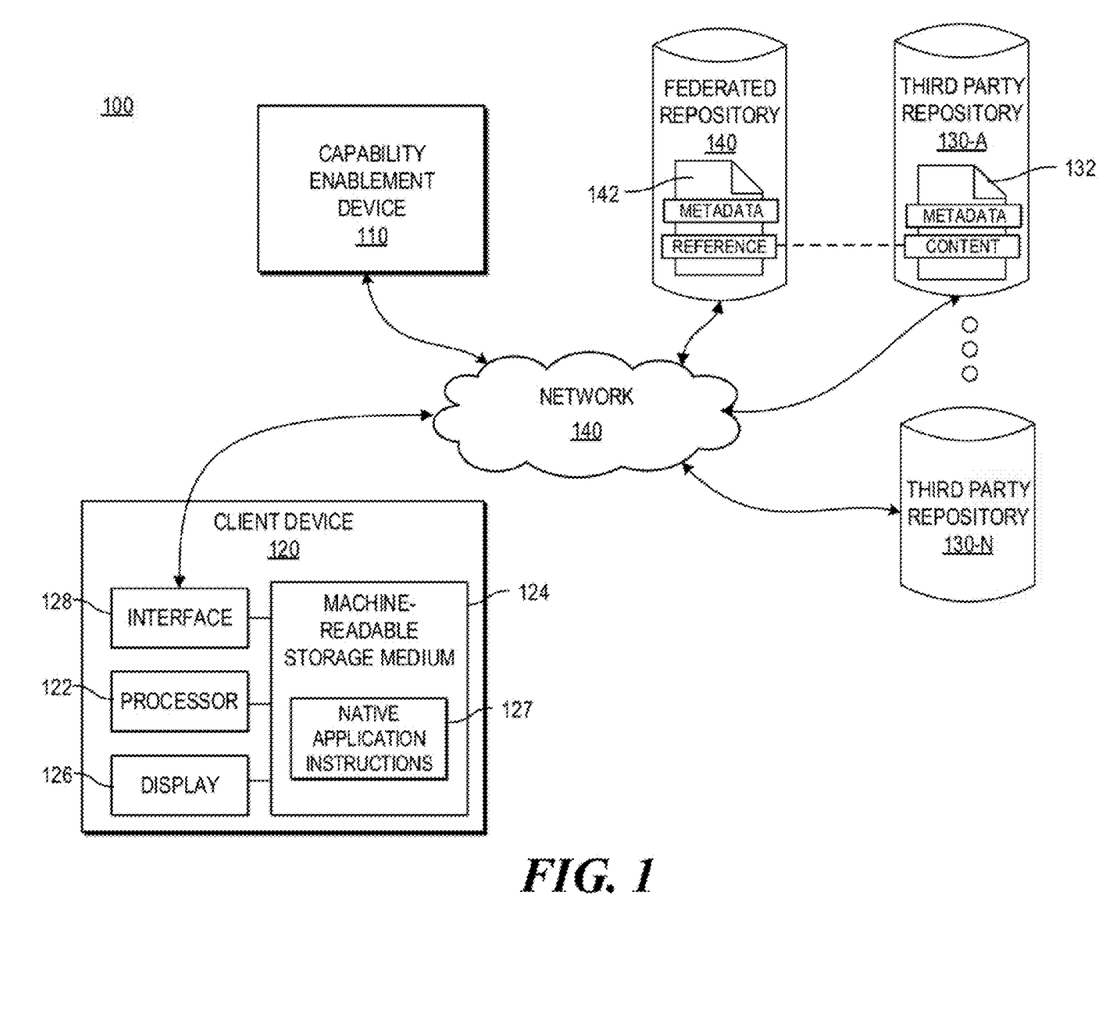
FIG. 1 is a block diagram of an example system for enabling native application capabilities consistent with disclosed implementations.

Referring now to the drawings, FIG. 1 is a block diagram of an example system 100 for enabling native application capabilities consistent with disclosed implementations. System 100 may be implemented in a number of different configurations without departing from the scope of the disclosed examples. In the example shown in FIG. 1, system 100 may include a capability enablement device 110, a client device 120, a plurality of third party repositories 130-A through 130-N, a federated repository 140, and a network 150 for connecting capability enablement device 110 with client device 120, at least one third party repository 130, and/or federated repository 140.

Capability enablement device 110 may be a computing system that performs various functions consistent with disclosed examples, such as enabling, in a native application, at least one native application capability associated with a source object available to a third party application handling the source object. For example, capability enablement device 110 may be a desktop computer, a laptop computer, a tablet computing device, a mobile phone, a server, or any other type of computing device. In some examples, capability enablement device 110 may process information received from client device 120, at least one third party repository 130, and/or federated repository 140. For example, capability enablement device 110 may determine a set of object capabilities related to a source object stored in a third party repository, determine at least one native application capability associated with the object based on the determined set of object capabilities, and enable, in a native application, the at least one native application capability for a third party application. A capability may be a type of action that can be performed on a source object, and a source object may be a file or a folder. Examples of capability enablement device 110 and certain functions that may be performed by device 110 are described in greater detail below with respect to, for example, FIGS. 2-5.

Client device 120 may be a computing system operated by a user. For example, client device 120 may be a desktop computer, a laptop computer, a tablet computing device, a mobile phone, a server, and/or any other type of computing device. In some examples, client device 120 may be a computing device to perform operations consistent with certain disclosed implementations. For example, client device 120 may be adapted to connect a user with multiple third party services via a common user interface associated with a content management system.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as native application instructions 127) to display a user interface, to detect a request associated with the user interface, and to provide content stored in a remote third party repository in response to the request. Machine-readable storage medium 124 may be any electronic, magnetic, optical, or other non-transitory storage device that stores instructions executed by processor 122. Display device 126 may be any type of display device that presents information, such as a user interface, to a user operating client device 120. Interface device 128 may be any combination of hardware and/or programming that facilitates the exchange of data between the internal components of client device 120 and external components, such as capability enablement device 110. In some examples, interface device 128 may include a network interface device that allows client device 120 to receive and send data to and from capability enablement device 110, at least one third party repository 130, and/or federated repository 140 via network 150.

Each third party repository 130 may be any type of storage system configuration that facilitates the storage of data. For example, third party repository 130 may facilitate the remote storage of objects. In some implementations, third party repository 130 may be a collection of components remote to capability enablement device 110, client device 120, federated repository 140, and/or other components of system 100. For example, each third party repository 130 may be infrastructure owned, operated, or otherwise managed by a third party that remotely stores objects related to a user. Thus, in some implementations, each third party repository (e.g., 130-A, 130-N, etc.) may be associated with a different third party and may be accessed using that third party's API. While in the example shown in FIG. 1 each third party repository 130 is illustrated as a single component, each third part)/repository 130 may comprise a plurality of separate components.

As shown in FIG. 1 (for simplicity in third party repository 130-A only), an object stored in third party repository 130 may be considered a source object 132. Source object 132 may include information, such as metadata and content. For example, source object 132 may include information about the content of the source object as well as the content itself. In some implementations, capability enablement device 110 may federate at least one source object 132 to populate federated repository 140.

Federated repository 140 may be any type of storage system configuration that facilitates the storage of data. For example federated repository 140 may facilitate the locating, accessing, and retrieving of data from objects stored in at least one of third party repositories 130-A through 130-N. In some implementations, federated repository 140 may be a component or collection of components capable of being managed by capability enablement device 110. For example, federated repository 140 may be managed by components of capability enablement device 110 that are capable of accessing, creating, controlling, and/or otherwise managing data.

Federated repository 140 can be populated by a number of methods. For example, capability enablement device 110 may discover a source object 132 in any of third party repositories 130-A through 130-N and create a federated object 142 associated with the source object 132. In some implementations, the federated object 142 may be an instance of the source object 132 and may include a copy of the source object metadata and/or a reference to the source object 132 instead of content. For example, federated object 142 may include information to direct capability enablement device 110, client device 120, and/or another device to source object 132 and/or content within source object 132. In some implementations, the information may include a uniform resource locator ("URL") to access the source object 132, an object identifier that uniquely identifies the object, and a connector identifier that uniquely identifies an instance of a connector that may access the source object 132.

A connector may include data and instructions to access a content source. For example, a connector may include data relating to a set of object capabilities, and instructions that, when executed by a processor, access a third party repository. For example, when the connector instructions are executed by a processor, such as a processor associated with capability enablement device 110, the instructions may cause the processor to access a third party repository via network 150. In some implementations, a connector may translate, rewrite or otherwise convert native application calls into equivalent repository-specific calls. Thus, in some implementations, federated repository 140 may include a unique connector for each third party repository. Furthermore, in some implementations, federated repository 140 may include a number of instances of a particular connector. For example, federated repository may include a first number of instances of a first connector, a second number of instances of a second connector, a third number of instances of a third connector, and the like. In some implementations, an instance of a connector may correspond to an object. Thus, federated repository 140 may store one or more instances of a connector for each user that uses a particular third party service, and each instance of the connector may include a unique identifier. Examples of operations performed when connector instructions are executed on a processor are discussed in further detail below with respect to, for example FIG. 4.

Network 150 may be any type of network that facilitates communication between remote components, such as capability enablement device 110 and client device 120. For example, network 150 may be a local area network (LAN), a wide area network (WAN), a virtual private network, a dedicated intranet, the Internet, and/or a wireless network.

The arrangement illustrated in FIG. 1 is an example, and system 100 may be implemented in a number of different configurations. For example, while FIG. 1, shows one capability enablement device 110, client device 120, federated repository 140, and network 150, system 100 may include any number of components 110, 120, 130, 140, and 150 as well as other components not depicted in FIG. 1. System 100 may also omit any of components 110, 120, 130, 140, and 150. For example, capability enablement device 110 and federated repository 140 may be directly connected instead of being connected via network 150.

Figure 2:
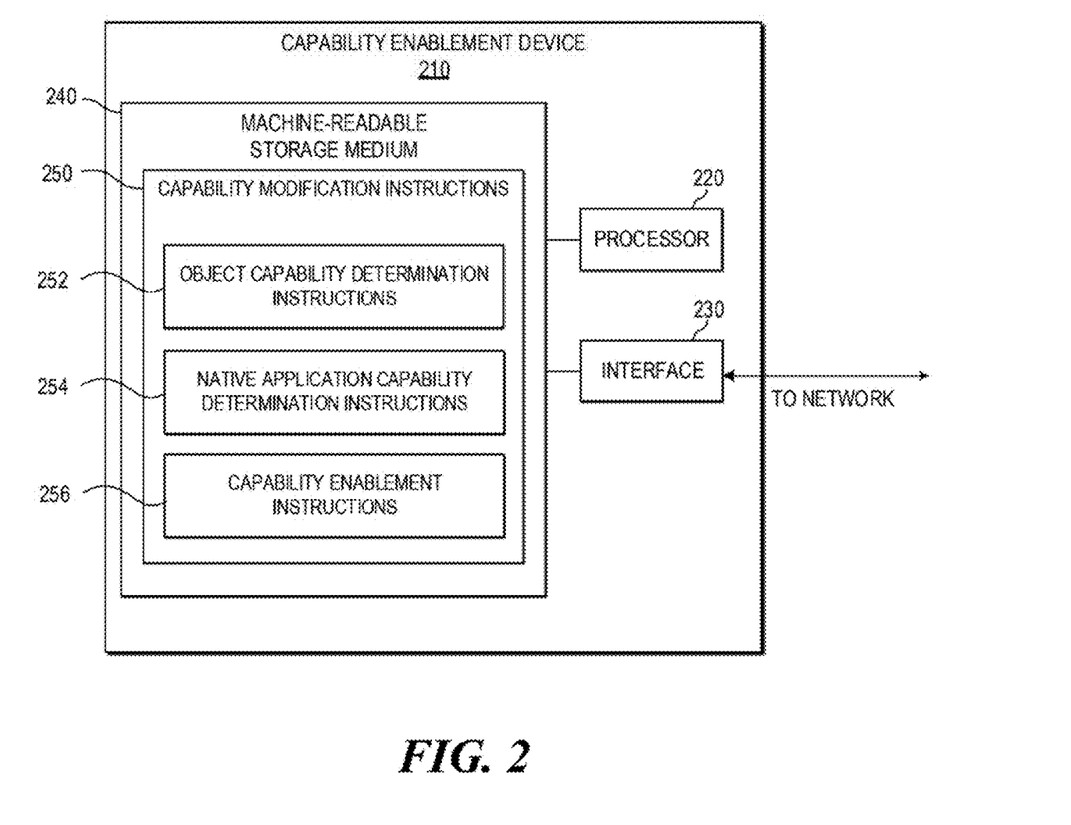
FIG. 2 is a block diagram of an example capability enablement device consistent with disclosed implementations.

FIG. 2 is a block diagram of an example capability enablement device 210 consistent with disclosed implementations. In certain aspects, capability enablement device 210 may correspond to capability enablement device 110 of FIG. 1. Capability enablement device 210 may be implemented in various ways. For example, capability enablement device 210 may be a special purpose computer, a server, a mainframe computer, a computing device executing instructions that receive and process information and provide responses, a mobile phone, and/or any other type of computing device. In the example shown in FIG. 2, capability enablement device 210 may include a processor 220, an interface 230, and a machine-readable storage medium 240.

Processor 220 may be at least one processing unit (CPU), microprocessor, and/or another hardware device to execute instructions to perform operations. For example, processor 220 may fetch, decode, and execute capability modification instructions 250 (e.g., instructions 252, 254, and/or 256) stored in machine-readable storage medium 240 to perform operations related to disclosed examples.

Interface device 230 may be any device that facilitates the transfer of information between device 210 and external components, such as client device 120. In some examples, interface device 230 may include a network interface device that allows device 210 to receive and send data to and from network 150. For example, interface device 230 may retrieve and process data related to user actions from client device 120 via network 150.

Machine-readable storage medium 240 may be any electronic, magnetic, optical, or other physical storage device that stores executable instructions. Thus, machine-readable storage medium 240 may be, for example, Random Access Memory (RAM), Electrically-Erasable Programmable Read-Only Memory (EEPROM), a storage drive, an optical disc, and the like. In some implementations, machine-readable storage medium 240 may be a non-transitory computer-readable storage medium, where the term "non-transitory" does not encompass transitory propagating signals. Machine-readable storage medium 240 may be encoded with instructions that, when executed by processor 220, perform operations consistent with disclosed implementations. For example, machine-readable storage medium 240 may include instructions that perform operations that may enable, in a native application, at least one native application capability for a third party application. In the example shown in FIG. 2, machine-readable storage medium 240 may include object capability determination instructions 252, native application capability determination instructions 254, and capability enablement instructions 256.

Object capability determination instructions 252 may function to determine a set of object capabilities related to a source object stored in a repository. For example, when object capability determination instructions 252 are executed by processor 220, object capability determination instructions 252 may cause processor 220 of capability enablement device 210, processor 122 of client device 120, and/or another processor to query a federated repository for a set of object capabilities and receive, in response to the query, the set of object capabilities. The set of object capabilities may represent the capabilities of the source object available to a third party application handling the source object. Examples of steps involved in determining a set of object capabilities are described in further detail below with respect to, for example, FIGS. 3-5.

Native application capability determination instructions 254 may function to determine at least one native application capability associated with the source object based on the determined set of object capabilities. For example, when native application capability determination instructions 254 are executed by processor 220, native application capability determination instructions 254 may cause the processor 220 of capability enablement device 210, the processor 122 of client device 120, and/or another processor to compare a set of core capabilities to the determined set of object capabilities, and/or select, as a native application capability, a core capability in the set of core capabilities that corresponds with a capability in the set of object capabilities. Examples of steps involved in determining at least one native application capability associated with the source object are described in further detail below with respect to, for example, FIGS. 3-5.

Capability enablement instructions 256 may function to enable, in the native application, the native application capability for the source object. For example, when capability enablement instructions 256 are executed on a processor, such as processor 220 of capability enablement device 210 capability enablement instructions 256 may cause processor 220 of capability enablement device 210, processor 122 of client device 120, and/or another processor to provide functionality to perform an action associated with the source object via the native application capability, and translate a request related to the action into a native request to the third party application (e.g., a repository-specific request). Examples of steps involved in enabling a native application capability for a source object are described in further detail below with respect to, for example, FIGS. 3-5.

Figure 3:
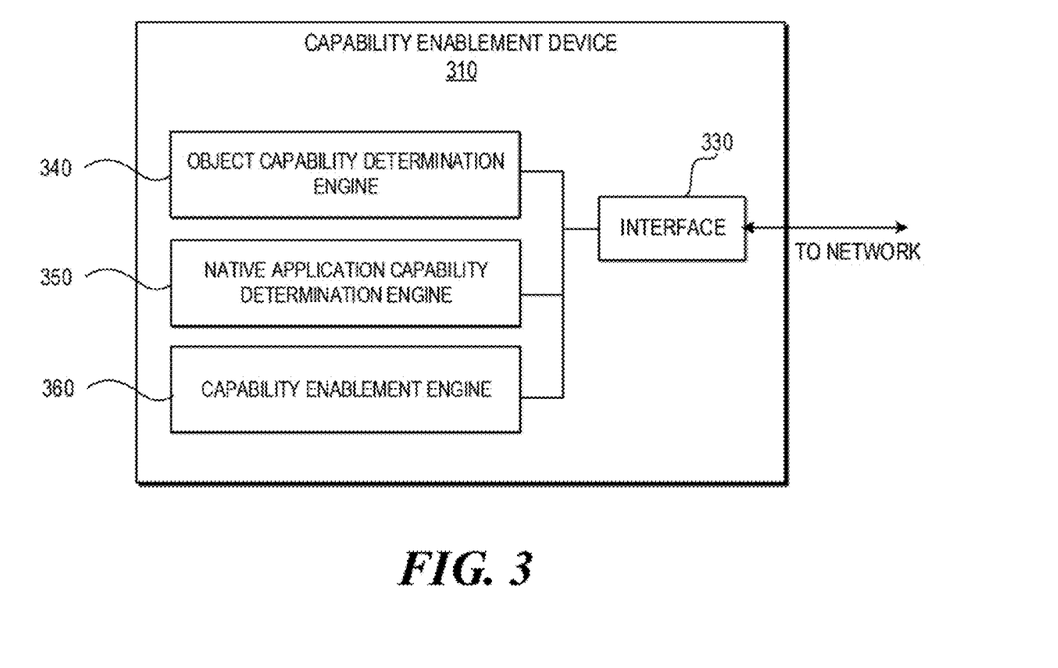
FIG. 3 is a block diagram of an example capability enablement device consistent with disclosed implementations.

FIG. 3 is a block diagram of an example capability enablement device 310 consistent with disclosed implementations. In certain aspects, capability enablement device 310 may correspond to capability enablement device 110 of FIG. 1 and/or capability enablement device 210 of FIG. 2. Device 310 may be implemented in various ways. For example, device 310, like device 210, may be a special purpose computer, a server, a mainframe computer, a computing device executing instructions that receive and process information and provide responses, and/or any other type of computing device. In the example shown in FIG. 3, device 310 may include an interface device 330 an object capability determination engine 340, a native application capability determination engine 350, and a capability enablement engine 360.

Interface device 330 may be any device that facilitates the transfer of information between capability enablement device 310 and external components, such as client device 120. In some examples, interface device 330 may include a network interface device that allows capability enablement device 310 to receive and send data to and from network 150. For example, interface device 330 may retrieve and process data related to a native application from client device 120 via network 150.

Engines 340, 350, and 360 may be electronic circuitry for implementing functionality consistent with disclosed examples. For example, engines 330, 340, and 350 may represent combinations of hardware devices and programming to implement functionality consistent with disclosed implementations. For example, the programming for the engines may be processor executable instructions stored on a non-transitory machine-readable storage medium and the hardware for the engines may include a processing resource to execute those instructions. In some examples, the functionality of engines 340, 350, and 360 may correspond to operations performed by capability enablement device 210 of FIG. 2, such as operations performed when user action performance measurement instructions 250 are executed by processor 220 (described above with respect to FIG. 2). In FIG. 3 object capability determination engine 340 may represent a combination of hardware and programming that performs operations similar to those performed when processor 220 executes object capability determination instructions 252. Similarly, native application capability determination engine 350 may represent a combination of hardware and programming that performs operations similar to those performed when processor 220 executes native application capability determination instructions 254, and capability enablement engine 360 may represent a combination of hardware and programming that performs operations similar to those performed when processor 220 executes capability enablement instructions 256.

Figure 4:
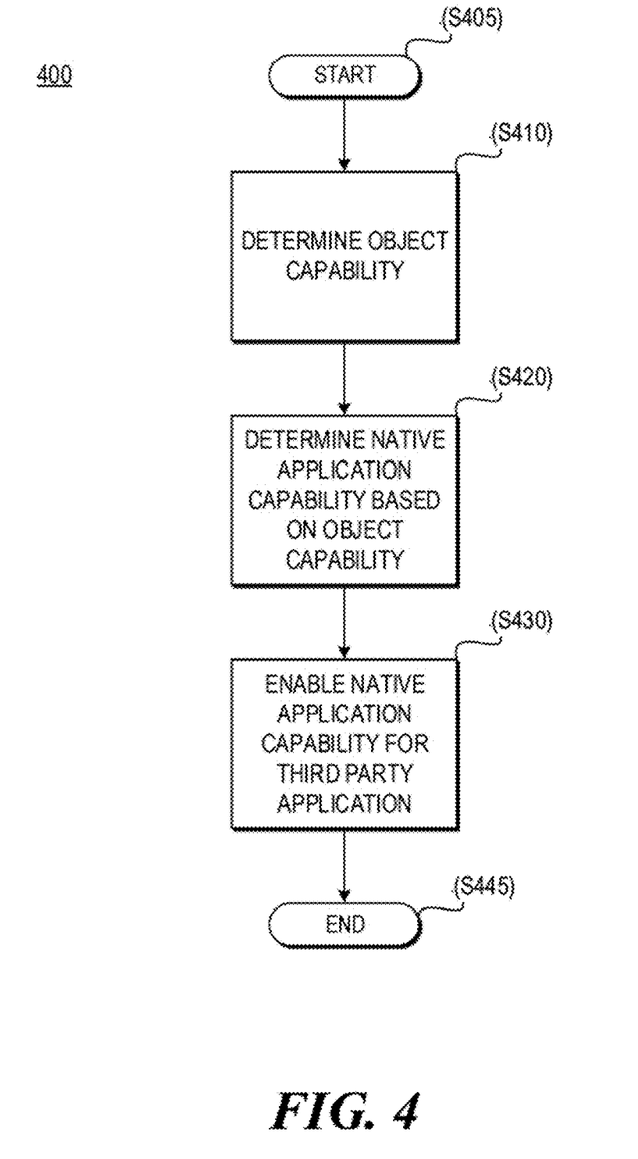
FIG. 4 is a flow chart of an example process for enabling a native application capability consistent with disclosed implementations.

FIG. 4 is a flow chart of an example process 400 for enabling native application capabilities consistent with disclosed implementations. Although execution of process 400 is described below with reference to system 100 of FIG. 1 and/or specific components of system 100, other suitable systems and devices for execution of at least one step of process 400 may be used. For example, processes described below as being performed by capability enablement device 110 may be performed by client device 120, capability enablement device 210, capability enablement device 310, and/or any other suitable device. Process 400 may be implemented in the form of executable instructions stored in a machine-readable storage medium and/or in the form of electronic circuitry.

Process 400 may start (step S405) when a user interacts with a native application's user interface. For example, client device 120 may output a user interface on an available display, such as display device 126. The user interface may include content, such as text, graphics, or a combination of text and graphics, which represents information and/or actions that are available to a user. For example, the user interface may include hyperlinks, radio buttons, checkboxes, text entry boxes, buttons, and/or other types of controls that a user may interact with. Users may interact with the interface by inputting a user action related to a remote source object to client device 120. For example, a user may execute a mouse click, move a mouse, execute a touch gesture on a touch-enabled display, execute a voice command, or provide another type input to access the source object. An example of a user interface including native application capabilities with which a user can interact is discussed in further detail below with respect to, for example, FIG. 5.

Capability enablement device 110 may receive the selection of the object from a user and, in response to the selection, may start process 400. Process 400 may include determining a set of object capabilities (step S420) related to a source object stored in a remote third party repository. In some implementations, the set of object capabilities may represent at least one capability enabled for, useable with, and/or otherwise associated with the source object available to a third party application handling the source object. For example, if a third party application provides file sharing, Boolean search, and image rendition for the source object, the set of object capabilities may constitute information indicating that file sharing, Boolean search, and image rendition are available for the source object.

In some examples, process 400 may include determining a set of object capabilities related to the source object by querying a federated repository. For example, capability enablement device 110 may query federated repository 140 for the set of object capabilities. As discussed above, in some implementations federated repository 140 may include a number of federated objects 142. The federated objects 142 may include information to access a source object (e.g., an object identifier that uniquely identifies the object and/or connector identifier that uniquely identifies an instance of a connector that may access the source object). Thus, in some implementations, capability enablement device 110 may query federated repository for a federated object 142 with an object identifier that matches the object identifier of the requested source object. Capability enablement device 110 may determine the appropriate connector identifier to access the source object from the federated object 142 that includes the matching object identifier. The instance of the connector associated with this connector identifier may be considered to be a target connector.

In some implementations, a target connector (and/or at least one connector in federated repository 140) may store a set of capabilities associated with a particular source object. For example, the set of capabilities may be stored in an array in the target connector when the connector for a specific third party is being developed. In some implementations, the set of capabilities may be stored as an array of key value pairs, where the key may be the capability name, and the value may be the level of support of the capability (e.g., supported, not supported, partially supported, and the like). As another example, the set of capabilities may be stored in an array in a target connector dynamically. For example, the target connector may query a third party repository about what capabilities are available to it, receive a response to the query from the third party repository, and store the response in the array.

In some implementations, capability enablement device 110 may query the repository for capability-related information (e.g., a set of object capabilities) stored in the target connector. In response to the query, federated repository 140 may return the capability-related information from the target connector. For example, federated repository 140 may return the array stored in the target connector and/or information included in the array to capability enablement device 110 and/or another device. Capability enablement device 110 may then provide data regarding the set of capabilities to a storage device, such as a machine-readable storage medium, federated database 140, and/or another device for additional processing.

Process 400 may also include determining a native application capability associated with the object (step S420). In some implementations, process 400 may include determining a native application capability based on the determined set of object capabilities. For example, capability enablement device 110 may determine a set of core capabilities of the native application, compare the set of core capabilities to the determined set of object capabilities, and select a capability from the set of core capabilities that corresponds to a capability in the determined set of object capabilities. A core capability may represent a portion of functionality available in an application. For example, a core capability may reflect an action that may be performed via the native application on an object stored at a remote third party repository. Thus, in some implementations, the set of core capabilities may represent all actions that may be performed on an object via a native application without regard to a third party application that handles the object.

Capability enablement device 110 may determine a set of core capabilities in various ways. In some implementations, capability enablement device 110 may receive, access, retrieve, and/or otherwise obtain the set of core capabilities. For example, capability enablement device 110 may access a registry of pre-defined core capabilities from a storage device, such as a machine-readable storage medium associated with capability enablement device 110, machine-readable storage medium 124 of client device 120, and/or any other device capable of storing data. In some implementations, capability enablement device 110 may determine that each capability in the registry is part of the set of core capabilities. In other implementations, capability enablement device 110 may determine that only some capabilities in the registry are part of the set of core capabilities (e.g., one capability, five capabilities, and the like). The registry may be at least one file (e.g., a HTML file, an XML file, etc.) that provides a list of core capabilities and/or information (e.g., a uniform resource locator ("URL")) to facilitate execution of the core capabilities.

The registry may be organized in a number of ways. In some implementations, core capabilities within the registry may be organized into folder capabilities and file capabilities. Table 1 includes a list of exemplary folder capabilities, as well as a brief description of the capability.

TABLE 1

Exemplary List of Core Folder Capabilities

| Capability | Description |
|---|---|
| SNS | Supports documents with the same name |
| canShare | Supports folder sharing |
| searchType | Supports whether and what type of search can be conducted. For example:<br>None: does not support any type of search<br>Name: supports file name search<br>Metadata: supports standard metadata search<br>Application Metadata: supports application metadata search<br>Boolean: supports Boolean search<br>Full Text: supports search inside a plurality of documents |
| isObservable | Supports observers registering to receive an event update when the folder or its contents are updated |
| createDocument | Supports creating new documents |
| getDocument | Supports obtaining existing documents |
| getDescendants | Supports obtaining child folders of a parent folder |
| createFolder | Supports creating new folders |
| deleteFolder | Supports deleting folders |

Table 2 includes a list of exemplary file capabilities, as well as a brief description of the capability.

TABLE 2

Exemplary List of Core File Capabilities

| Capability | Description |
|---|---|
| createDocument | Supports creating a document |
| ACL | Supports an access control list to determine object permissions. For example:<br>None: there is no support to know or change permissions of an object<br>Discover: supports discovering but not changing permissions in an object<br>Manage: supports discovering and managing permissions of objects |
| settableAttributes | Supports a list of attributes that can be set by the application. For example:<br>Name: a document or folder name<br>Description: a document or folder description<br>Tags: a list of user tags for the objects<br>Metadata: a set of arbitrary key values |
| gettableAttributes | Supports a list of attributes that can be obtained by an application as part of the object description. For example:<br>Name: a document or folder name<br>Description: a document and/or folder description<br>Tags: a list of user tags for the objects<br>Metadata: a set of arbitrary key values<br>CreateDate: when the object was created<br>UpdateDate: when the document was updated<br>Owner: who created the document<br>LastUpdatedBy: who last updated the document |
| renditionType | Supports whether an object can be rendered. For example:<br>None: object cannot be rendered (e.g., transformed)<br>Image: object can be rendered to images (e.g., PNG)<br>PDF: object can be transformed to PDF<br>iFrame: object can be transformed to HTML iFrame to be embedded |
| canPublish | Supports obtaining a unique URL to access documents |
| Versionable | Supports creating new versions of documents |
| Workflows | Supports providing a list of workflow names that a document can be submitted to |

The lists of examples of core capabilities in Tables 1 and 2 are not exhaustive, and implementations consistent with this disclosure can include fewer or more core capabilities. Additionally, core capabilities within the registry do not need to be organized by whether they are related to a file or folder. For example, the core file capabilities and the core folder capabilities may be organized into a single list, each core capability may be part of a different file within the registry, and the like.

Capability enablement device 110 may use the set of core capabilities to determine a native application capability. For example, in some implementations capability enablement device 110 may select a capability in the set of core capabilities that corresponds to a capability in the set of object capabilities. In some implementations, capability enablement device 110 may also compare the set of core capabilities to the set of object capabilities. A capability in the set of core capabilities that matches a capability in the set of object capabilities may be considered to be a capability match. Capability enablement device 110 may select, as the native application capability, a capability associated with the capability match. Capability enablement device 110 may provide data regarding the native application capability and/or the capability match to a storage device, such as a machine-readable storage medium, federated database 140, and/or another device for additional processing.

Process 400 may also include enabling, in the native application, the native application capability for the third party application (step S430). In some implementations, the native application capability may be enabled by providing functionality to perform an action associated with the source object via the at least one native application capability. For example, capability enablement device 110 may provide the user with the ability to perform the action by determining functionality associated with the capability match and exercising the functionality associated with the capability match.

Capability enablement device 110 may determine functionality associated with the capability match in a number of ways. In some implementations, capability enablement device 110 may determine the functionality based on information contained in the registry of core capabilities. For example, capability enablement device 110 may access the registry to determine information associated with the capability match. The information may include information to facilitate execution of the capabilities. For example, the information may include a uniform resource locator ("URL") or other link via which the native application can access the capabilities. As another example, the information to facilitate execution of the capabilities may be provided to capability enablement device 110 in response to a query for the set of object capabilities. For example, the information to facilitate execution of the capabilities may be stored in an instance of a connector associated with the source object. Thus, in some implementations, when capability enablement device 110 queries federated repository 140, federated repository may return the set of object capabilities and URLs to exercise the capabilities. Applications may access the capabilities using the provided URL.

Capability enablement device 110 may exercise the functionality associated with the capability match in a number of ways. For example, in some implementations, capability enablement device 110 may transmit the URL to client device 120 such that a native application running on client device 120 can access the source object via the URL. For example, in some implementations a native application e.g., a content management system) may be fully data driven such that it implements a representational state transfer ("REST") architecture within a distributed hypermedia system. Thus, a client device, such as client device 120, may interact with a representation of the source object via the provided URL, and a user interface of the native application displayed on the client device may be automatically configured to access the capabilities via the URL.

Figure 5:
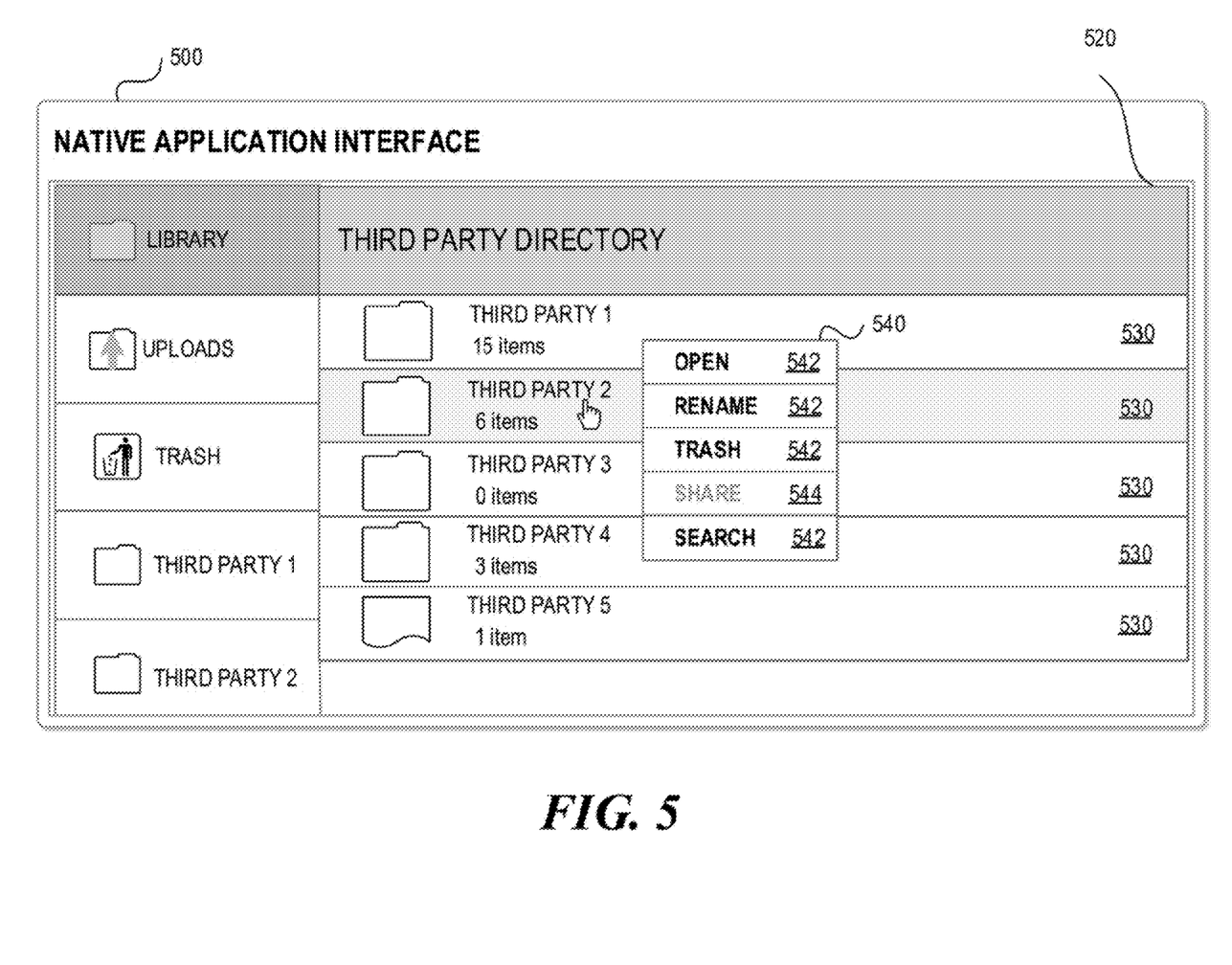
FIG. 5 is an example of a native application interface consistent with disclosed implementations.

FIG. 5 is an example of a native application interface 500 consistent with disclosed implementations. In some implementations, interface 500 may be generated by device 110 using data obtained from, for example, a machine-readable medium, client device 120, third party repositories 130-A through 130-N, federated repository 140, and/or another component. For example, system 100 may generate interface 500 to execute functionality associated with an enabled native application capability. In some implementations, capability system 100 may display interface 500 on a display device, such as display 126 of client device 120.

As shown in FIG. 5, interface 500 may include an area 520 for displaying a source object available to a user. For example, area 520 may display a source objects available to a user using a virtual representation 530 of the source object. The virtual representation 530 may be displayed as text, graphics, or a combination of text and graphics. For example, the virtual representation could include a graphic indicating the type of object (e.g., a file or a folder) and text indicating information related to the source object (e.g., the file name, the folder name, how many objects are included in the folder, the date the folder was last modified, the third party related to the file or folder, and/or the like). In some implementations, the virtual representations 530 may represent a user's files or folders that are related to a third party application and are stored in a remote third party repository. For example, virtual representations 530 may correspond to files (e.g., documents, photos, etc.) or folders uploaded by a user to the users third party service account. The third party service may be any third party service in which the user maintains, maintained, or could create and maintain an account. For example, the third party service may be an electronic mail service, a social media service, a file sharing site, and the like. In the example shown in FIG. 5, area 520 may show that there are five third party services available to the user, each of which includes a number of remotely stored objects related to the user. Specifically, area 520 of the example shown in FIG. 1 illustrates that the user has 15 objects related to Third Party 1, 6 objects related to Third Party 2, 0 objects related to Third Party 3, 3 objects related to Third Party 4, and 1 object related to Third Party 5.

A user may input a selection of a source object via a virtual representation 530 of the object displayed on native application interface 500. When the source object is selected by the user, native application interface 500 may display capabilities that are available for that source object. For example, as shown in FIG. 5, interface 500 may display a capability list 540 that includes capabilities that are enabled 542 for the particular object. The capability list 540 may be displayed as text, graphics, or a combination of text and graphics. Each enabled capability 542 in the capability list may include a link that directs the user to a URL in which the capability is enabled (e.g., the URL corresponding to a particular capability described above with respect to, for example, step S430). In addition to showing capabilities that are enabled, interface 500 may also show core capabilities of the native application that are not enabled 544 for the third party application. For example, capability list 540 may display the unavailable core capability 544 with an indicator that the core capability is not available. For example, capability list 540 may display the unavailable core capability 544 as greyed out text.

In the example shown in FIG. 5, when a user performs a user action (e.g., a button click) via the virtual representation 530 of a source object (e.g. a folder) associated with Third Party 2, capability list 540 is displayed showing four native application capabilities 542 related to Third Party 2 ("open," "rename," "trash," "search,") and one unavailable core capability 544 ("share"). A user may perform an action on the source object using one of the native application capabilities 542. For example, the native application may translate the action into a native call to the third party application (e.g., a repository-specific call). The third party application may then execute the action at the repository where the source object is stored using the translation.

The disclosed examples may include systems, devices, computer-readable storage media, and methods for enabling native application capabilities. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Additionally, the disclosed examples may be implemented in various environments and are not limited to the illustrated examples.

Moreover, as used in the specification and the appended claims the singular forms "a," "an," and "the" are intended to include the plural forms as well, unless the context indicates otherwise. Additionally, although the terms first, second, etc, may be used herein to describe various elements, these elements should not be limited by this terms. Instead, these terms are only used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those in in FIG. 4. For example, process 400 need not be performed in response to a user action. Thus, the present disclosure merely sets forth possible examples of implementations, and many variations and modifications may be made to the described examples. All such modifications and variations are intended to be included within the scope of this disclosure and protected by the following claims.

We claim:

1. A system for enabling native application capabilities comprising:
    a memory to store instructions; and
    a processor to execute the instructions to perform operations for implementing native application capabilities, including operations to:
        determine, from a source object stored in a remote third party repository, a set of object capabilities related to the source object, the set of object capabilities representing at least one capability associated with the source object available to a third party application handling the source object;
        based on the determined set of object capabilities, determine a native application capability associated with the source object; and
        enable, in a native application of a client device external to the system and to the third party repository, the native application capability for the source object, the enabled native application capability enabling the client device to access the source object in the remote third party repository without involvement of the system.

2. The system of claim 1, wherein the operations to determine the set of object capabilities comprises operations to:
    query a federated repository for the set of object capabilities based on a unique object identifier associated with the source object; and
    receive, in response to the query, the set of object capabilities.

3. The system of claim 2, wherein:
    the federated repository includes a plurality of instances of a connector to access the remote third party repository;
    an instance of the connector is associated with the query based on the unique object identifier, the instance including an array that stores the set of capabilities; and
    the federated repository returns the array in response to the query.

4. The system of claim 1, including operations to disable, in the native application, a portion of a functionality for the third party application that does not correspond to the native application capability.

5. The system of claim 1, wherein the operations to determine the native application capability comprises operations to:
    compare a set of core capabilities to the determined set of object capabilities; and
    select, as the native application capability, a capability in the set of core capabilities that corresponds with a capability in the set of object capabilities.

6. The system of claim 1, wherein the operations to enable the at least one native application capability comprises operations to:
    provide functionality to perform an action associated with the source object via the native application capability; and
    translate a request related to the action into a native request to the third party application.

7. The system of claim 6, wherein the operations to provide functionality to perform the action comprises operations to:
    determine a functionality associated with the native application capability;
    exercise the functionality associated with the native application capability; and
    modify a user interface to display the at least one native application capability.

8. The system of claim 7, wherein the functionality is exercised via a uniform resource locator associated with the native application capability.

9. The system of claim 1, wherein:
    the set of object capabilities includes at least one of a set of folder capabilities and a set of file capabilities;
    the set of folder capabilities includes at least one of a search type, a document creation type, and an event update type; and
    the set of file capabilities includes at least one of a rendition type and a document modification type.

10. The system of claim 1, wherein the instructions are executed by the processor responsive to receiving from the client device a user selection of the source object.

11. The system of claim 1, wherein the client device accesses the source object in the remote third party repository via a uniform resource locator associated with the enabled native application capability.

12. A non-transitory computer-readable storage medium including instructions that, when executed by a processor of a capability enablement device for implementing native application capabilities, cause the processor to:
    access a federated object stored in a federated repository to determine, from the federated object, a set of object capabilities related to a source object;
    determine a set of core capabilities of a native application;
    determine a capability match between the set of object capabilities and the set of core capabilities;
    based on the capability match, modify a collection of functionalities accessible in the native application for the source object to correspond to third party application functionality related to the source object, wherein the native application is executed by a client device external to the capability enablement device and the federated repository, and wherein the modified functionalities enable the client device to access the source object without involvement of the capability enablement device.

13. The computer-readable storage medium of claim 12, wherein modifying the collection of functionalities comprises:

enabling, in the native application, a capability in the set of core capabilities that matches a capability in the set of object capabilities; and disabling, in the native application, a capability in the set of core capabilities that does not match a capability in the set of object capabilities.

14. The computer-readable storage medium of claim 12, wherein the collection of functionalities is modified via a uniform resource locator associated with the capability match.

15. The computer-readable storage medium of claim 12, wherein the source object is one of a file and a folder.

16. The medium of claim 12, wherein the source object is stored in a remote third party repository different from the federated repository, and wherein the modified functionalities enable the client device to access the source object in the remote third party repository.

17. A computer-implemented method for implementing native application capabilities comprising:

determining, with a capability enablement device (CED), from a source object stored in a remote third party repository, a set of object capabilities related to the source object, the set of object capabilities representing at least one capability associated with the source object available to a third party application handling the source object;

based on the determined set of object capabilities, determining, with the CED, a native application capability associated with the source object; and enabling, by the CED, a native application capability for the source object in a native application of a client device external to the CED and to the third party repository, wherein the enabled native application capability enables the client device to access the source object in the remote third party repository without involvement of the CED.

18. The method of claim 17, wherein determining the set of object capabilities, determining a native application capability, and enabling a native application capability are performed responsive to receiving from the client device a user selection of the source object.

* * * * *